United States Patent
Kishita

[11] Patent Number: 5,838,652
[45] Date of Patent: Nov. 17, 1998

[54] DATA PROCESSING OPTICAL HEAD APPARATUS

[75] Inventor: Satoru Kishita, Yokohama, Japan

[73] Assignee: Kabushiki Kaisha Toshiba, Kawasaki, Japan

[21] Appl. No.: 689,059

[22] Filed: Jul. 30, 1996

[30] Foreign Application Priority Data

Jul. 31, 1995 [JP] Japan .................................. 7-194699

[51] Int. Cl.⁶ ...................................................... G11B 7/00
[52] U.S. Cl. ........................ 369/112; 369/116; 369/44.23
[58] Field of Search ........................... 369/116, 110, 369/54, 121, 118, 44.24, 44.31, 44.23, 112, 103, 109

[56] References Cited

U.S. PATENT DOCUMENTS

| | | |
|---|---|---|
| 5,136,152 | 8/1992 | Lee . |
| 5,146,449 | 9/1992 | Shimozawa ........................... 369/116 |
| 5,173,890 | 12/1992 | Miyake et al. ...................... 369/44.23 |
| 5,212,572 | 5/1993 | Krantz et al. ......................... 369/110 |
| 5,293,372 | 3/1994 | Hoshino et al. . |
| 5,475,210 | 12/1995 | Taguchi et al. . |
| 5,563,870 | 10/1996 | Silverstein ............................. 369/112 |

FOREIGN PATENT DOCUMENTS

| | | |
|---|---|---|
| 43 36 546 | 5/1994 | Germany . |
| 85 01 473 | 12/1986 | Netherlands . |

OTHER PUBLICATIONS

Patent Abstracts of Japan, vol. 96, No. 8, 30 Aug. 1996 and JP–A–08 087768 (Toshiba Corp.), 2 Apr. 1996.

*Primary Examiner*—Thang V. Tran
*Attorney, Agent, or Firm*—Pillsbury Madison & Sutro LLP

[57] ABSTRACT

An data-processing apparatus comprising an optical head to oppose an optical disk. The optical head has a laser-detector unit. The unit comprises of a semiconductor laser, a first photodetector and a second photodetector, which are located close to one another and in almost the same plane. The first photodetector is designed to generate data signals from a light beam, and the second photodetector is designed to generate monitor signals from a light beam. An optical diffraction element, a collimating lens, an aperture controller, a correction prism and a focusing lens are arranged in the optical path extending from the laser to the optical disk. The prism has a reflecting surface which is inclined at a prescribed angle to a plane perpendicular to the optical axis. The collimating lens focuses a light beam reflected by the reflecting surface, on the light-receiving surface of the second photodetector.

4 Claims, 3 Drawing Sheets

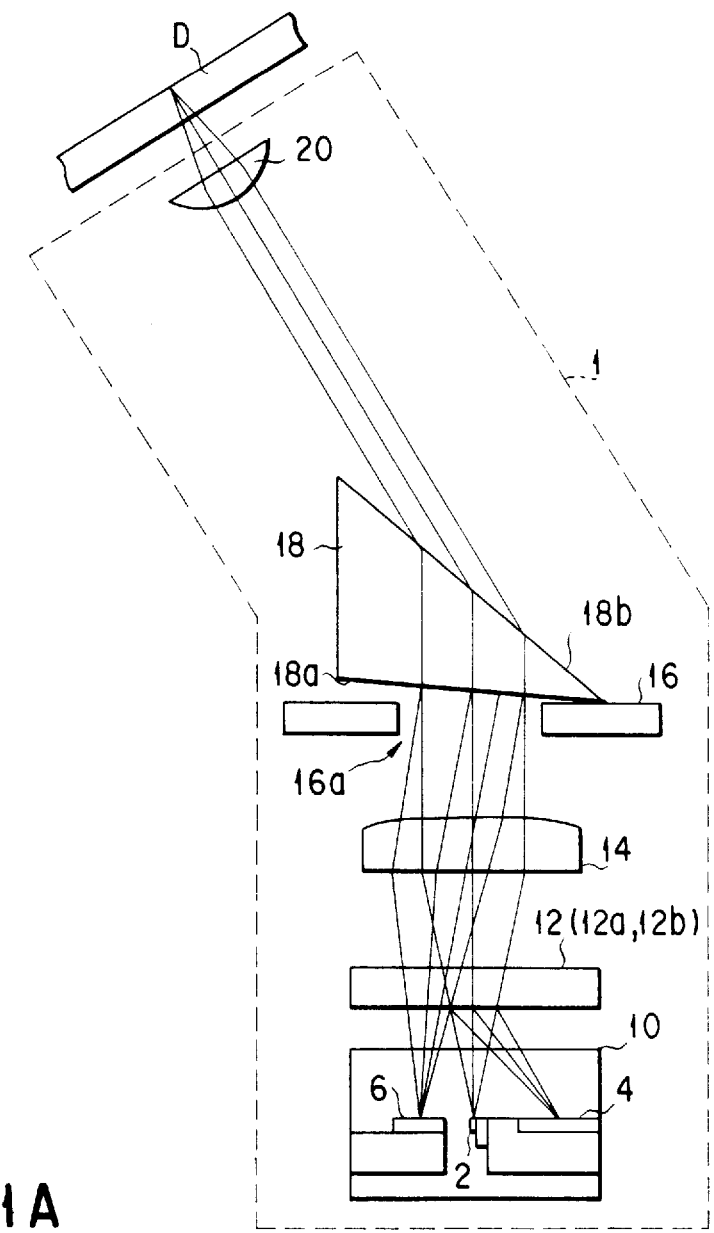
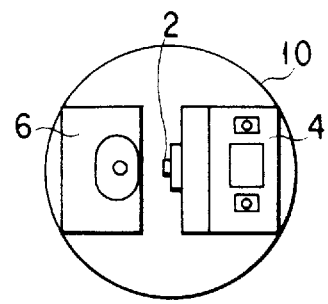
F I G. 1A
F I G. 1B

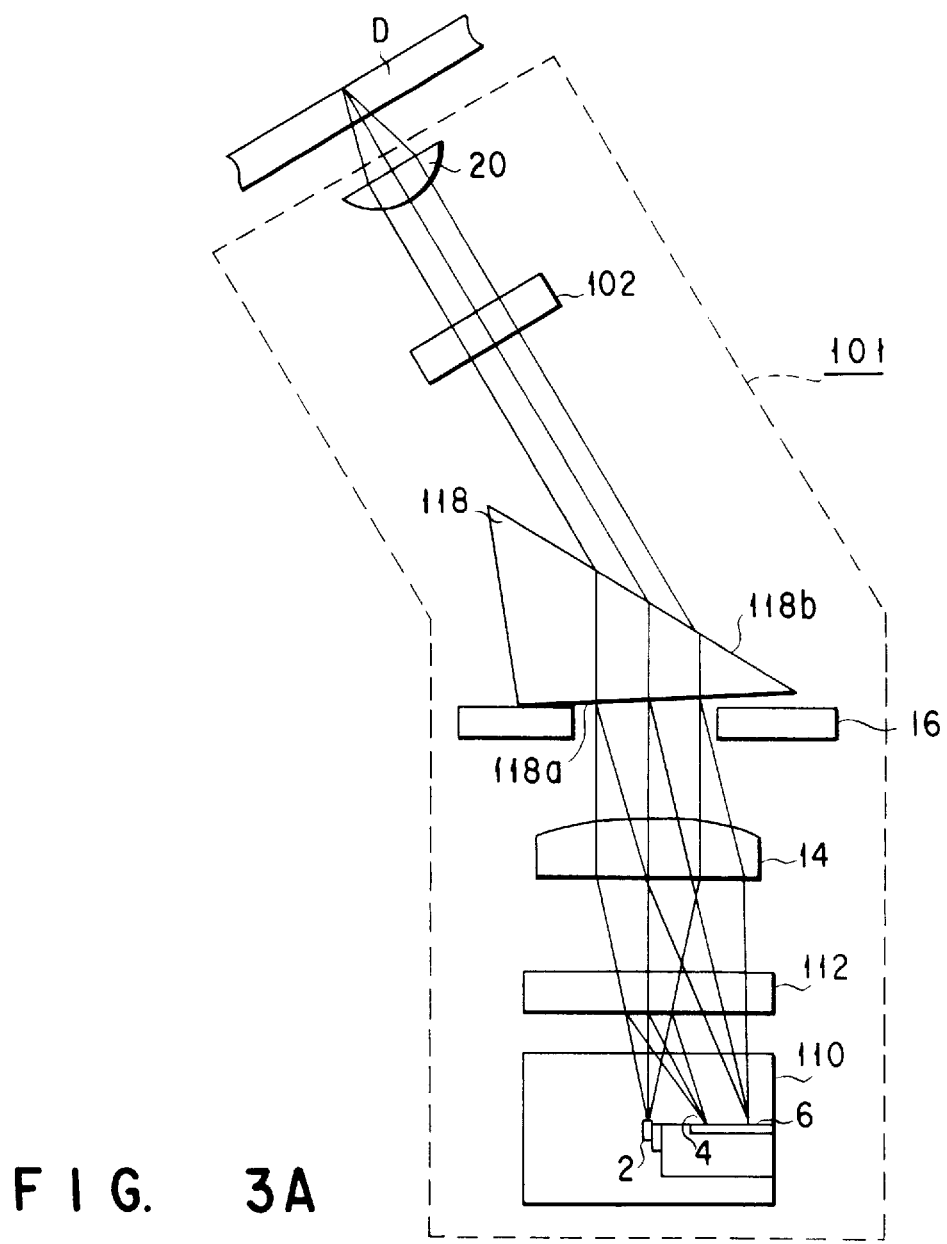
F I G. 3A
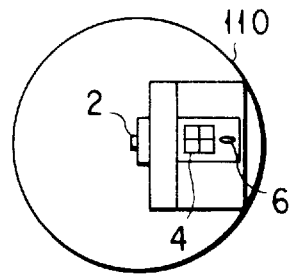
F I G. 3B

DATA PROCESSING OPTICAL HEAD APPARATUS

BACKGROUND OF THE INVENTION

1. Field of the Invention

The present invention relates to a data-processing apparatus and, more particularly to an optical head apparatus which optically records data on a recording medium, such as an optical disk, and which optically reproduces the data from the recording medium.

2. Description of the Related Art

Generally, a data-processing apparatus optically records data on a recording medium, such as an optical disk, and reproduces the data from the medium has an optical head. The optical head applies a light beam to the recording/reproducing surface of the medium to record data on the medium, and applies a light scan to the surface of the medium and receives the light reflected by the medium to reproduce the data from the recording medium.

The optical head comprises a semiconductor laser, a collimating lens, a focusing lens, a deflecting element, and a photodetector. The semiconductor laser is used as the light source. The collimating lens collimates the dispersing light emitted from the laser. The focusing lens receives the collimated light (i.e., a parallel beam) from the collimating lens and focuses it on an optical disk which is used as a recording medium. The deflecting element receives the light beam reflected by the disk and applied through the focusing lens and deflects the light beam in a predetermined direction. The photodetector receives the deflected light beam and converts it into electric signals. The electric signals represent the data reproduced from the optical disk.

The optical head further comprises another photodetector and a laser driver. This photodetector monitors the amount of light the semiconductor laser emits. The laser driver controls the laser on the basis of the amount of light the photodetector monitors, so that the laser may emit light in a predetermined amount.

Two methods of monitoring the amount of light emitted from a semiconductor laser are known. The first method is to monitor the light emitted from the back of the semiconductor laser traveling away from a recording medium. The second method is to monitor the light emitted from the front of the laser and traveling toward the recording medium. Hereinafter, the light traveling away from the medium will be referred to as "backward light," and the light traveling toward the medium as "forward light."

The first method has disadvantages, however. It cannot detect the amount of backward light accurately and cannot serve to control the semiconductor laser such that the laser emits light in the predetermined amount. This is because the backward light is influenced by the forward light reflected by the medium and reaching, though in a small amount, the semiconductor laser. Consequently, the amount of the backward light cannot be proportionate to the amount of the forward light, making it difficult to cause the laser to emit light in a desired amount.

The second method has disadvantages also. To perform the second method, an optical head needs to have two additional components. The first additional component is a beam splitter for splitting the forward light beam into two beams. The second additional component is a focusing lens for focusing one of the beams obtained by the beam splitter at the light-receiving surface of the photodetector for monitoring the light emitted from the laser. The use of these additional components inevitably increases the size of the optical head and the manufacturing cost thereof.

SUMMARY OF THE INVENTION

In view of the foregoing, an object of the present invention is to provide a data-processing apparatus which is simple in structure, can be manufactured at low costs and which can reliably record and reproduce data.

To achieve this object, a data-processing apparatus comprising: a light source for emitting a light beam; adjusting unit constructed and arranged to adjust an amount in which the light beam is emitted from the light source; a collimating lens constructed and arranged to collimate the light beam; a focusing lens constructed and arranged to focus the light beam collimated by the collimating lens, on a recording medium; deflecting portion constructed and arranged to deflect the light beam reflected by the recording medium and applied through the focusing lens to a first position near the light source; first light-receiving element provided at the first position, constructed and arranged to receive the light beam deflected by the deflecting and converting the same into an electric data signal; a reflecting surface provided between the collimating lens and the focusing lens, having a reflectance of at most 50% and inclined from plane perpendicular to an optical axis of the collimating lens, constructed and arranged to reflect a part of the light beam applied through the collimating lens and focusing the same at a second position near the light source; a second light-receiving element provided at the second position, constructed and arranged to receive the light beam focused at the second position and converting the same into an electric monitor signal; and control unit constructed and arranged to control the adjusting unit in accordance with the electric monitor signal, thereby causing the adjusting unit to adjust the amount in which the light beam is emitted from the light source.

A data-processing apparatus according to another aspect of the invention comprises: a data-processing apparatus comprising: a light source for emitting a light beam; adjusting unit constructed and arranged to adjust an amount in which the light beam is emitted from the light source; a collimating lens constructed and arranged to collimate the light beam; a focusing lens constructed and arranged to focus the light beam collimated by the collimating lens, on a recording medium; polarization plane rotating member constructed and arranged to allow passage of the light beam applied toward the recording medium, allow passage of the light beam reflected by the recording medium and to rotate a polarization plane of the light beam reflected by the recording medium; deflecting portion provided between the light source and the polarization plane rotating member constructed and arranged to allow passage of the light beam emitted from the light source and deflect the light beam which reflected by the recording medium and whose polarization plane is rotated by the polarization plane rotating member to a first position near the light source; first light-receiving element provided at the first position, constructed and arranged to receive the light beam deflected by the deflecting portion and converting the same into an electric data signal; a reflecting surface provided between the collimating lens and the polarization plane rotating member, having a reflectance of at most 50% and inclined from a plane perpendicular to an optical axis of the collimating lens, constructed and arranged to reflect a part of the light beam applied through the collimating lens and focusing the same at a second position near the light source; a second light-receiving element provided at the second position, constructed and arranged to receive the light beam focused at the second position and converting the same into an electric monitor signal; and control unit constructed and arranged to control the adjusting means in accordance with the electric monitor signal, thereby causing the adjusting unit to adjust the amount in which the light beam is emitted from the light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a schematic view showing the internal structure of the optical head incorporated in a data-processing apparatus according to a first embodiment of the invention;

FIG. 1B is a plan view of the laser-detector unit built in the optical head shown in FIG. 1A;

FIG. 3A is a schematic view showing the internal structure of the optical head incorporated in a data-processing apparatus according to a second embodiment of the invention; and FIG. 3B is a plan view of the laser-detector unit built in the optical head shown in FIG. 3A.

DETAILED DESCRIPTION OF THE PREFERRED EMBODIMENTS

Figure 2:
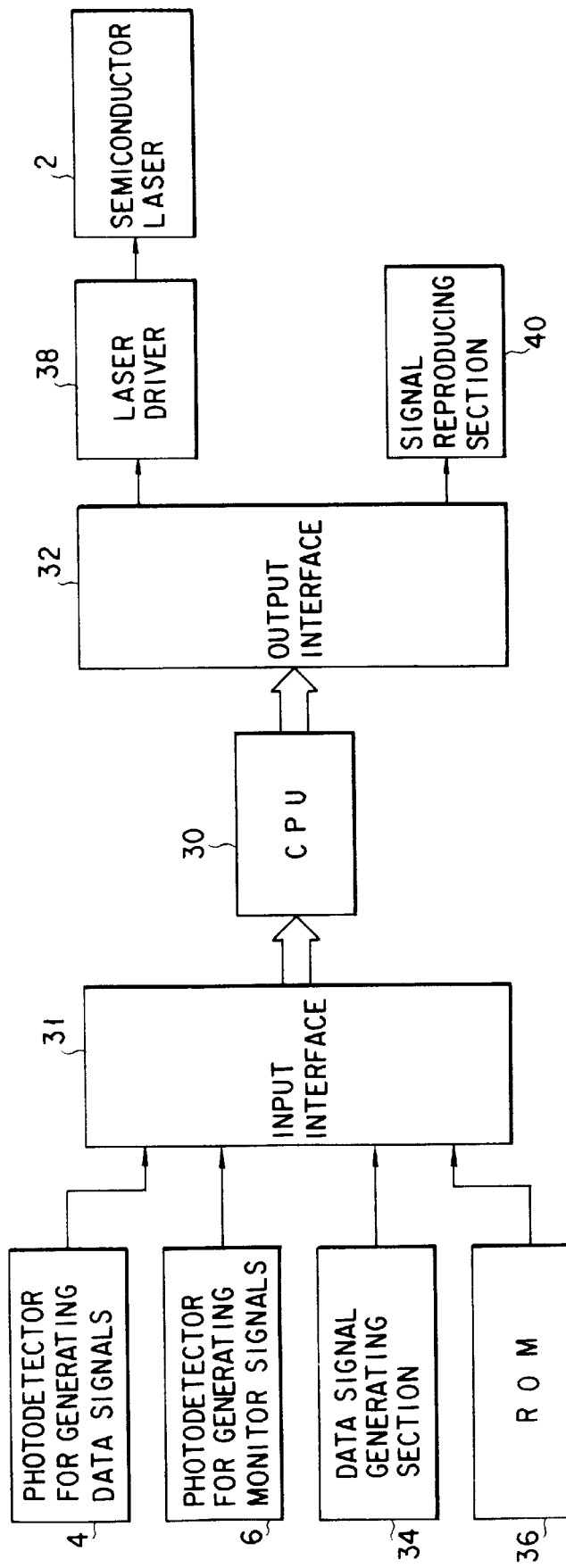
FIG. 2 is a block diagram illustrating the control system provided in the data-processing apparatus according to a first embodiment of the invention.

Embodiments of the present invention will be described in detail, with reference to the accompanying drawings.

FIGS. 1A and 1B show the optical head 1 incorporated in a data-processing apparatus according to the first embodiment of the invention. In use, the optical head is located to opposite the recording/reproducing surface of an optical disk D used as a recording medium. As shown in FIG. 1A, the optical head 1 has a laser-detector unit 10. The laser-detector unit 10 comprises a semiconductor laser 2, a first photodetector 4 and a second photodetector 6 which are located in almost the same plane as is illustrated in FIG. 1B. The semiconductor laser 2, the first photodetector 4 and the second photodetector 6 are used as a light source, a first light-receiving unit constructed and arranged to generate data signals, and the second light-receiving unit constructed and arranged to generate monitor signals, respectively. The photodetectors 4 and 6 are arranged at first and second positions, near the semiconductor laser 2.

The optical head 1 further comprises an optical diffraction element 12, a collimating lens 14, an aperture controller 16, a correction prism 18 and a focusing lens 20. These components 12, 14, 16 and 18 are arranged, in the order mentioned, in the optical path extending from the semiconductor laser 2 to the optical disk D. The collimating lens 14 converts the dispersing light emitted from the laser 2 to a parallel light beam. The aperture controller 16 functions as diaphragm means. The correction prism 18 serves as correction means. The focusing lens 20 focuses the light output from the collimating lens 14 and applied through the controller 16 and the prism 18, forming a beam spot on the recording/reproducing surface of the optical disk D. The correction prism 18 has a reflecting surface 18a and an inclined surface 18b. The surface 18a has a reflectance of 50% or less. The surface 18b is inclined at a predetermined angle to the reflecting surface 18a.

The optical diffraction element 12 is shaped like a plate. It extends substantially parallel to a plane which is perpendicular to the axis of the light beam emitted from the semiconductor laser 2 toward the optical disk D. The element 12 has a light-diffracting section 12a and a light-passing section 12b. The light-diffracting section 12a performs two functions. The first function is to allow the passage of the light beam emitted from the semiconductor laser 2. The second function is to deflect the light beam reflected by the optical disk D and thus representing data, toward the first photodetector 4. The light-passing section 12b allows the passage of the monitor light beam reflected by the reflecting surface 18a of the correction prism 18, without reflecting this light beam.

The collimating lens 14 is placed in a horizontal plane which is substantially at a right angle to the optical axis of the semiconductor laser 2. Not only does the lens 14 collimates the dispersed light beam which has been emitted from the semiconductor laser 2 and which has passed through the light-diffracting section 12a of the optical diffraction element 12. But also does the lens 14 focus the light beam reflected by the reflecting surface 18a of the correction prism 18, at the light-receiving surface of the second photodetector 6 which is provided for detecting monitor signals. In other words, the collimating lens 14 works as a focusing lens, as well.

The light beam reflected by the reflecting surface 18a of the correction prism 18 and focused by the collimating lens 14 passes through the light-passing section 12b of the optical diffraction element 12. This light beam is then focused at the light-receiving surface of the second photodetector 6.

The correction prism 18 has its reflecting surface 18a inclined at a prescribed angle from a plane which extends at a right angle to the optical axis of the semiconductor laser 2. Since the reflecting surface 18a is inclined so, all light beam it reflects is applied to the effective region of the collimating lens 14 and is focused by the collimating lens 14. This beam focused is applied to only the light-passing section 12b of the optical diffraction element 12, not to the light-diffracting section 12a thereof. The beam passes through the light-passing section 12b and reach the light-receiving surface of the second photodetector 6 provided for generating monitor signals.

The correction prism 18 is a triangular prism. As indicated above, it has a reflecting surface 18a and a inclined surface 18b. The inclined surface 18b refracts toward the focusing lens 20 the input light beam having been emitted from the semiconductor laser 2, passed through the light-diffracting section 12a and the collimating lens 14 and applied to the reflecting surface 18a of the correction lens 18. The inclined surface 18b also reduces the ellipticity of the light beam. Namely, the ellipticity of the beam can be changed by inclining the axis of the beam to the major axis of an elliptical area in a plane perpendicular to the axis of the beam. This is because the intensity of a light beam emitted from a semiconductor laser 2 is distributed generally in that elliptical area. Hence, the intensity of the light beam in the cross section thereof can be distributed, desirably in a substantially circular area by setting the inclination angle of the surface 18b of the correction prism 18.

The aperture controller 16 provided between the collimating lens 14 and the correction prism 18 extend almost parallel to a plane which is at a right angle to the optical axis of the semiconductor laser 2. The aperture controller 16 has a substantially circular aperture 16a and an adjusting mechanism (not shown) designed to adjust the opening of the aperture 16a. The opening of the aperture 16a is adjusted so that; the beam reflected by the reflecting surface 18a of the correction lens 18 is applied in its entirely within the effective region of the collimating lens 14; the beam focused by the collimating lens 14 may pass through the light-passing section 12b of the optical diffraction element 12; and the beam may be applied to the second photodetector 6 provided for generating monitor signals.

The data-processing apparatus having the optical head described above has a control system, which will be described below.

As shown in FIG. 2, the control system has a CPU 30 used as control means. An input interface 31 is connected to the CPU 30. Connected to the input interface 31 are a first detect or 4, a second detector 6, a data signal generating section 34, and a ROM 36. The section 34 is provided to store data to be recorded on the optical disk D. The ROM 36 stores various control data items, among which are a first reference value for the amount of a data-recording light beam and a second reference value for the amount of a data-reproducing light beam.

An output interface 32 is connected to the CPU 30. Connected to the output section 32 are a laser driver 38 and a signal reproducing section 40. The driver 38 adjusts the amount of a light beam emitted from the laser 2. The section 40 processes the data signals generated by the first photodetector 4, thereby to reproduce the data signals.

The operation of the data-processing apparatus will be described.

At first, the semiconductor laser 2 emits a light beam, the amount of which is adjusted by the laser driver 38 adjusts. The light beam passes through the light-diffracting section 12a of the optical diffraction element 12, the collimating lens 14, and the reflecting surface 18a and the inclined surface 18b of the correction lens 18. The light beam is then focused the focusing lens 20 and thereby applied to the recording/reproducing surface of the optical disk D.

Part of the light beam emitted from the semiconductor laser 2 is reflected by the reflecting surface 18a of the correction lens 18 and applied back to the collimating lens 14. It then passes through the collimating lens 14 and through the light-passing section 12b of the optical diffraction element 12. Finally it is focused on the second photodetector 6 by the collimating lens 14.

To record data on the optical disk D, the signals representing the data are generated by the data signal generating section 34. The data signals are supplied to the laser driver 38 through the input interface 31 and CPU 30, output interface 32. The laser driver 38 emits light beam the amount of which is modulated in accordance with the data signals. Meanwhile, the second photodetector 6 monitors the light beam emitted from the semiconductor laser 2, detecting the amount of the light beam. The amount of light detected by the photodetector 6 is compared with the first reference value stored in the ROM 36. The CPU 30 controls the laser driver 38, whereby the amount of light beam emitted from the laser 2 becomes equal to the desired amount for the data-recording light beam. The light beam thus controlled in amount is focused on the recording/reproducing surface of the optical disk D. As a result, the data is recorded on the optical disk D.

To reproduce the data from the optical disk D, the second photodetector 6 monitors the light emitted from the semiconductor laser 2, detecting the amount of the beam. The amount of the light beam is compared with the second reference value stored in the ROM 36. The CPU 30 controls the laser driver 38, whereby the amount of light beam emitted from the laser 2 becomes equal to the desired amount for the data-reproducing light beam. The light beam thus controlled in amount is focused on the recording/reproducing surface of the optical disk D. As a result, the data is reproduced from the optical disk D.

The light beam reflected by the optical disk D is focused on the first photodetector 4 after passing through the focusing lens 20, correction prism 18, aperture controller 16, collimating lens 14 and the light-diffracting section 12a of the optical diffraction element 12. The first photodetector 4 generates data signals from the light beam. These data signals (i.e., the reproduced data signals) are processed by the signal reproducing section 40. As a result, the data recorded on the optical disk D is reproduced.

In the data-processing apparatus, the collimating lens 14 is used not only to collimate the light beam emitted from the semiconductor laser 2, but also to focus the light beam reflected by the disk D on the second photodetector 6 provided for generating monitor signals. Thus, the apparatus requires neither a beam splitter element for splitting the monitor light beam into two beams nor a focusing lens for focusing one of the beams obtained by the beam splitter to the second photodetector 6. The apparatus is therefore simple in structure and can be manufactured at low costs.

As described above, the semiconductor laser 2, first photodetector 4 and second detector 6 are provided together within the laser-detector unit 10, not spaced apart from one another. This helps to render the apparatus small.

An data-processing apparatus according to the second embodiment of the invention will be described. The components which are similar or identical to those of the first embodiment will be designated at the same reference numerals and will not be described in detail.

The apparatus according to the second embodiment has an optical head 101 shown in FIG. 3A. In use, the optical head 101 is located opposite an optical disk D. The head 101 has a laser-detector unit 110. The laser-detector unit 110 comprises a semiconductor laser 2, a first photodetector 4 and a second photodetector 6. In the second embodiment, the photodetectors 4 and 6 are located close to each other, in almost the same plane and on the right side of the laser 2, as is illustrated in FIG. 3B.

The second photodetector 6 has a light-receiving region, extending in the direction in which the light beam reflected from the reflecting surface 118a of a correction prism 118 is deflected. Being elongate, the light-receiving region can compensate for an error, if any, of the inclination angle of the reflecting surface 118a. Therefore, no particular means is required to adjust the inclination angle of the reflecting surface 118a with high accuracy.

The optical head 101 further comprises a polarizing hologram 112, a collimating lens 14, an aperture controller 16, the correction prism 118, a quarter-wavelength plate 102, and a focusing lens 20 - - - all arranged in the order mentioned in an optical path extending from the semiconductor laser 2 toward the optical disk D. Since both photodetectors 4 and 6 are located on the right side of the semiconductor laser 2, the surface 118a of the prism 118 is inclined in the direction opposite to the direction in which its counter part is inclined in the first embodiment.

The polarizing hologram 112 allows the passage of the entire light beam emitted from the laser 2 and also the light beam reflected by the reflecting surface 118a and deflects the light beam reflected by the optical disk D toward the first photodetector 4. In other words, the hologram 112 allows the passage of a component of the beam which is polarized in a certain direction and deflects in a prescribed direction another component of the beam which extends at a right angle to that component. Thus, a light beam twice applied through the quarter-wave plate 102 and polarized is deflected by the hologram 112 toward the first photodetector 4.

The operation of the optical head 101 described above will be explained.

First, the semiconductor laser 2 emits a light beam in an mount adjusted by the laser driver 38. The light beam is applied to the focusing lens 20 through the polarizing hologram 112, collimating lens 14, aperture controller 16, correction prism 118 and quarter-wave plate 102. The focusing lens 20 focuses the light beam on the recording/reproducing surface of the optical disk D.

The recording/reproducing surface of the optical disk D reflects the light beam. The beam reflected is applied through the focusing lens 20, quarter-wave plate 102, correction prism 118, aperture controller 16, collimating lens 14 and polarizing hologram 112 and is focused on the first photodetector 4. As the light beam passes twice through the quarter-wave plate 102, it is polarized. The light beam is deflected by the polarizing hologram 112.

Part of the light beam emitted from the semiconductor laser 2 is reflected by the reflecting surface 118a of the correction prism 118, focused by the collimating lens 14, supplied through the polarizing hologram 112 and focused on the second photodetector 6. This part of the light beam, which does not pass through the quarter-wave plate 102, is not polarized and therefore passes through the polarizing hologram 112, not deflected at all.

The second embodiment (FIG. 3A) can attain the same advantages as the first embodiment (FIG. 1A). Further, the polarizing hologram 112 and the quarter-wave plate 102 render it easy to adjust the other components of the optical head 101. Moreover, the error of adjusting the inclination angle of the reflecting surface 118a of the correction prism 118 can be compensated for, since the light-receiving region of the second photodetector 6 is, extending in the direction of deflecting the light beam reflected from the reflecting surface 118a.

The present invention is not limited to the embodiments described above. Various changes and modifications can be made within the scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data-processing apparatus comprising:

a light source for emitting a light beam:

an adjusting unit constructed and arranged to adjust an amount of the light beam emitted from said light source;

a collimating lens constructed and arranged to collimate the light beam;

a focusing lens constructed and arranged to focus the light beam collimated by said collimating lens on a recording medium;

a deflecting portion constructed and arranged to deflect the light beam reflected by the recording medium and applied through said focusing lens to a first position adjacent to said light source;

a first light-receiving element provided at the first position, constructed and arranged to receive the light beam reflected by said deflecting unit and converting the same into an electric data signal;

a reflecting surface provided between said collimating lens and said focusing lens, having a reflectance of at most 50% and inclined from a plane perpendicular to an optical axis of said collimating lens, constructed and arranged to reflect a part of the light beam applied through said collimating lens and focusing the same at a second position adjacent to said light source;

a second light-receiving element provided at the second position, constructed and arranged to receive the light beam focused at the second position and to convert the same into an electric monitor signal;

a control unit constructed and arranged to control said adjusting unit in accordance with the electric monitor signal, thereby to cause said light beam adjusting unit to adjust the amount of the light beam emitted from said light source; and an aperture controlling unit provided between said collimating lens and said reflecting surface and having an aperture whose diameter is less than an effective diameter of said collimating lens and greater than or equal to an effective diameter of said focusing lens, and wherein said reflecting surface and said aperture controlling unit have such inclination angles and such aperture diameters that the entire light beam reflected by said reflecting surface passes through said collimating lens.

2. The apparatus according to claim 1, wherein said deflecting portion has an optical diffraction element provided between said light source and said collimating lens, constructed and arranged to deflect to the first position the light beam reflected by the recording medium and applied through said focusing lens.

3. The apparatus according to claim 2, further comprising a processing unit constructed and arranged to process the electric data signal.

4. A data-processing apparatus comprising:

a light source for emitting a light beam;

an adjusting unit constructed and arranged to adjust an amount of the light beam emitted from said light source;

a collimating lens constructed and arranged to collimate the light beam;

a focusing lens constructed and arranged to focus the light beam collimated by said collimating lens, on a recording medium;

a deflecting portion constructed and arranged to deflect the light beam reflected by the recording medium and applied through said focusing lens to a first position adjacent to said light source;

a first light-receiving element provided at the first position, constructed and arranged to receive the light beam deflected by said deflecting portion and converting the same into an electric data signal;

a reflecting surface provided between said collimating lens and said focusing lens, having a reflectance of at most 50% and inclined from a plane perpendicular to an optical axis of said collimating lens, constructed and arranged to reflect a part of the light beam applied through said collimating lens and focusing the same at a second position adjacent to said light source;

a second light-receiving element provided at the second position, constructed and arranged to receive the light beam focused at the second position and to convert the same into an electric monitor signal; and a control unit constructed and arranged to control said adjusting unit in accordance with the electric monitor signal, thereby to cause said light beam adjusting unit to adjust the amount of the light beam emitted from said light source;

wherein said reflecting surface is inclined to reflect and apply the light beam through said collimating lens and to prevent the light beam from interfering with said deflecting portion.

* * * * *